US012013291B2

(12) United States Patent
Sheng et al.

(10) Patent No.: US 12,013,291 B2
(45) Date of Patent: Jun. 18, 2024

(54) ADVANCED TEMPERATURE MONITORING SYSTEM WITH EXPANDABLE MODULAR LAYOUT DESIGN

(71) Applicant: Applied Materials, Inc., Santa Clara, CA (US)

(72) Inventors: Shuran Sheng, Saratoga, CA (US); Lin Zhang, San Jose, CA (US); Joseph C. Werner, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 733 days.

(21) Appl. No.: 17/070,803

(22) Filed: Oct. 14, 2020

(65) Prior Publication Data

US 2022/0113198 A1    Apr. 14, 2022

(51) Int. Cl.
*G01K 3/00*   (2006.01)
*G01K 3/10*   (2006.01)
(Continued)

(52) U.S. Cl.
CPC .............. *G01K 3/005* (2013.01); *G01K 3/10* (2013.01); *G03F 7/427* (2013.01); *G06F 2119/08* (2020.01)

(58) Field of Classification Search
CPC .......... G01K 3/005; G01K 3/10; G03F 7/427; G06F 2119/08
See application file for complete search history.

(56) References Cited

U.S. PATENT DOCUMENTS 5,016,663 A * 5/1991 Mase ................ H01L 21/67069
134/1
6,210,485 B1 * 4/2001 Zhao ................... C23C 16/4481
118/724
(Continued)

FOREIGN PATENT DOCUMENTS

EP          2503021 A1    9/2012
KR      10-1285866 B1    7/2013
(Continued)

OTHER PUBLICATIONS

International Search Report and Written Opinion for International Application No. PCT/US2021/047376 dated Dec. 17, 2021.
(Continued)

*Primary Examiner* — Nathaniel T Woodward
*Assistant Examiner* — Philip L Cotey
(74) *Attorney, Agent, or Firm* — Patterson + Sheridan, LLP

(57) ABSTRACT

Embodiments herein provide methods of monitoring temperatures of fluid delivery conduits for delivering fluids to, and other components external to, a processing volume of a processing chamber used in electronic device fabrication manufacturing, and monitoring systems related thereto. In one embodiment, a method includes receiving, at the temperature monitoring system (TMS) controller, information from a first plurality of temperature sensors and a second plurality of temperature sensors, comparing, using the TMS controller, the temperature information to one or more pre-determined control limits, and communicating, using the TMS controller, an out-of-control event to a user. Generally, the temperature monitoring system features the first and second pluralities of temperature sensors, the TMS controller, a first connection module, and a second connection module.

22 Claims, 8 Drawing Sheets

(51) Int. Cl.
*G03F 7/42* (2006.01)
*G06F 119/08* (2020.01)

(56) References Cited

U.S. PATENT DOCUMENTS

| | | | | |
|---|---|---|---|---|
| 6,258,170 | B1* | 7/2001 | Somekh | C23C 16/45561 392/394 |
| 6,527,865 | B1* | 3/2003 | Sajoto | H01L 21/6715 118/724 |
| 6,635,114 | B2* | 10/2003 | Zhao | C23C 16/4402 118/726 |
| 7,642,205 | B2* | 1/2010 | Timans | H01L 21/67115 438/795 |
| 7,882,394 | B2* | 2/2011 | Hosek | G06F 11/008 714/48 |
| 8,983,631 | B2* | 3/2015 | Huang | G06F 9/5027 702/182 |
| 9,418,881 | B2 | 8/2016 | Sugiura | G05D 23/22 |
| 9,530,656 | B2* | 12/2016 | McChesney | H01J 37/3211 |
| 9,589,819 | B1* | 3/2017 | Takano | H01L 21/67248 |
| 9,978,565 | B2* | 5/2018 | McChesney | H01J 37/32082 |
| 2005/0098906 | A1* | 5/2005 | Satoh | C23C 16/455 438/758 |
| 2009/0046761 | A1* | 2/2009 | Pan | G01K 13/00 374/163 |
| 2011/0060571 | A1* | 3/2011 | Ueda | G06F 30/28 703/9 |
| 2013/0025786 | A1* | 1/2013 | Davidkovich | G05D 16/2046 137/1 |
| 2015/0132100 | A1* | 5/2015 | Lin | H01L 21/67248 414/805 |
| 2016/0172161 | A1* | 6/2016 | Ikenaga | H01J 37/32724 156/345.28 |
| 2017/0053049 | A1* | 2/2017 | Urban | C23C 16/46 |
| 2018/0342412 | A1* | 11/2018 | Miyoshi | C23C 16/4583 |
| 2019/0154521 | A1* | 5/2019 | Nosrati | G01D 5/268 |
| 2019/0221458 | A1* | 7/2019 | Lu | C23C 16/455 |
| 2019/0360954 | A1* | 11/2019 | Kubota | G01N 25/20 |

FOREIGN PATENT DOCUMENTS

| | | |
|---|---|---|
| KR | 101283571 B1 | 7/2013 |
| KR | 101285866 B1 | 7/2013 |
| KR | 20140118912 A | 10/2014 |
| WO | 2013025852 A1 | 2/2013 |
| WO | 2017031106 A1 | 2/2017 |
| WO | 2017056244 A1 | 4/2017 |

OTHER PUBLICATIONS

Office Action for Chinese Application No. 202190000793.0 dated Sep. 18, 2023.

MKS Instruments, Inc.—"Controlling Vapor Condensation and Downstream Deposits in Deposition and Etch Tools" Application Note, Jun. 2016-Dec. 2016, 8 pages.

* cited by examiner

ADVANCED TEMPERATURE MONITORING SYSTEM WITH EXPANDABLE MODULAR LAYOUT DESIGN

BACKGROUND

Field

Embodiments described herein generally relate to the field of semiconductor device manufacturing, and more particularly, to methods of monitoring components external to a processing volume of a processing chamber used in electronic device manufacturing, and monitoring systems related thereto.

Description of the Related Art

As circuit densities increase for next generation devices and transistor dimensions continue to shrink, clean, contamination free substrate processing environments become increasingly important. This is because undesirable particle contaminants on a surface of a substrate before, during, and/or after processing thereof, can adversely affect device performance and/or suppress device yield (the percentage of devices that conform to performance specifications out of a total number of devices manufactured). One known source of particle contamination results from condensation of vapor-phase precursors in fluid delivery conduits between a vapor-phase precursor source and a processing volume of a processing chamber.

Vapor-phase delivery systems, also known as vaporized liquid delivery systems, are commonly used in deposition processes, such as chemical vapor deposition (CVD) processes, atomic layer deposition (ALD) processes, or etch processes, where vapor-phase and sometimes gas precursors are reacted with, and/or on, the surface of a substrate to deposit a material layer thereon or to remove a portion of a material layer therefrom. Vapor-phase delivery systems provide gas flow control and delivery of precursors that are otherwise in a liquid-phase or a solid-phase at ambient temperature and below and at atmospheric pressure and above.

Vapor-phase delivery systems commonly use an evaporation source, such as a heating vessel, to transition the precursor from a liquid-phase or a solid-phase to a vapor-phase. Typically, during the processing of a substrate, the vapor-phase precursor flows into a processing volume of a processing chamber, such as a CVD processing chamber, an ALD processing chamber, or an etch processing chamber, through a delivery conduit, and a surface of the substrate is exposed thereto. Often, the delivery conduit is heated, such as with a flexible polymer heater jacket comprising a resistive heating element or with heater tape wrapped around the delivery conduit and an insulating cover disposed thereover. Heating the delivery conduit along the length thereof prevents condensation of the vapor-phase precursor therein. Nonetheless, non-uniform temperatures along the walls of the delivery conduit, such as cold spots, can result in undesirable condensation and/or deposition of the precursor on the inner surfaces thereof.

Unfortunately, undesirable condensation or deposition of the precursor in the delivery conduit leads to undesirable particle contamination in the processing volume and on the surface of the substrate disposed therein. Further, because flowrates of the vapor-phase precursors into the processing volume are often dependent on the temperature of both the evaporation source and the delivery conduit, non-uniform temperatures can undesirably impact the flowrate of the vapor-phase precursor. Changes in the flowrate of the vapor-phase precursor may affect the deposition rate and the material properties of the material layer deposited on the surface of the substrate.

Non-uniform temperatures along the delivery conduit can be the result of improper installation of a heater jacket, failure of the heating elements in the heating jacket, or failure of portions of heating elements. Non-uniform temperatures can also be the result of undesirable repositioning of the heating jacket during maintenance of the processing system, during maintenance of systems thereby, during facilities maintenance, or due to unintentional contact therewith. Often, non-uniform temperatures along the delivery conduit are not discovered until after resulting condensations in the delivery line causes a process excursion, such as a defectivity excursion, where particle contamination is found on the surface of a substrate after processing thereof or when suppressed device yield is traced back to the processing chamber through a commonality of substrates (having suppressed device yield) processed therethrough.

Further, conventional substrate processing systems are typically configured to monitor temperature measurements related to the substrate processing environment in the processing volume thereof. Generally, these processing systems lack the capability and flexibility to monitor temperature information related to processing components external to the substrate processing environment. High substrate processing temperatures, e.g., more than about 650° C., in the processing volume may adversely impact the performance and reliability of processing system components external to the processing volume but in thermal communication therewith.

Accordingly, what is needed in the art are methods of monitoring temperatures of delivery conduits to, and other components that are external to, a processing volume of a processing chamber used in electronic device fabrication manufacturing, and monitoring systems related thereto.

SUMMARY

Embodiments of the disclosure generally relate to substrate processing systems used in electronic device fabrication processes. More specifically, embodiments herein relate to methods of monitoring temperatures of delivery conduits to, and other components external to, a processing volume of a processing chamber used in electronic device fabrication manufacturing, and monitoring systems related thereto.

In one embodiment, a method of monitoring, using a temperature monitoring system (TMS), a plurality of surfaces of the one or more processing systems for changes in temperature in provided. The method includes receiving, at the temperature monitoring system (TMS) controller, information from a first plurality of temperature sensors and a second plurality of temperature sensors, comparing, using the TMS controller, the temperature information to one or more pre-determined control limits, and communicating, using the TMS controller, an out-of-control event to a user. Generally, the temperature monitoring system features the first and second pluralities of temperature sensors, the TMS controller, a first connection module, and a second connection module. Here, the first connection module comprises a first housing having one or more first terminal blocks disposed therein, second connection module comprises a second housing having one or more second terminal blocks disposed therein, and individual ones of the first and second pluralities of temperature sensors are disposed in locations external to one or more processing volumes of one or more corresponding processing chambers within the one or more processing systems. In some embodiments, each of the first plurality of temperature sensors are coupled to corresponding connection terminals of the one or more first terminal blocks, each of the second plurality of temperature sensors are coupled to corresponding connection terminals of the one or more second terminal blocks. In some embodiments, the first and second connection modules are arranged in series so that the first connection module is coupled to the second connection module using a first cable and the second connection module is coupled to the TMS controller using a second cable. Typically, the out of control event comprises a temperature measurement above or below the one or more pre-determined control limits.

In another embodiment, a method of detecting processing temperature excursions in a processing system is provided. the method includes receiving, at a temperature monitoring system (TMS) controller, information from a plurality of temperature sensors disposed external to a processing volume of a processing chamber, storing, in a memory of the TMS controller, data corresponding to the information received from each of the plurality of temperature sensors, comparing the data to one or more process control models, determining, based on the comparison of the data to the one or more process control models, whether a temperature excursion event has occurred, and displaying, for a user, a visual representation of temperature excursion events corresponding to each of the plurality of temperature sensors.

In another embodiment, a temperature monitoring system is provided. The temperature monitoring system includes a first plurality of temperature sensor, a second plurality of temperature sensors, a temperature monitoring system (TMS) controller, a first connection module, and a second connection module. Here, the first connection model features a first housing and one or more first terminal blocks disposed therein and the second connection module features a second housing having one or more second terminal blocks disposed therein. Generally, each of the first plurality of temperature sensors are coupled to corresponding connection terminals of the one or more first terminal blocks and each of the second plurality of temperature sensors are coupled to corresponding connection terminals of the one or more second terminal blocks. In some embodiments, the first and second connection modules are arranged in series so that the first connection module is coupled to the second connection module using a first cable and the second connection module is coupled to the TMS controller using a second cable.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the disclosure generally relate to substrate processing systems used in electronic device fabrication processes. More specifically, embodiments herein relate to methods of monitoring temperatures of fluid delivery conduits to, and other components external to, a processing volume of a processing chamber used in electronic device fabrication manufacturing, and advanced temperature monitoring systems related thereto.

Figure 1:
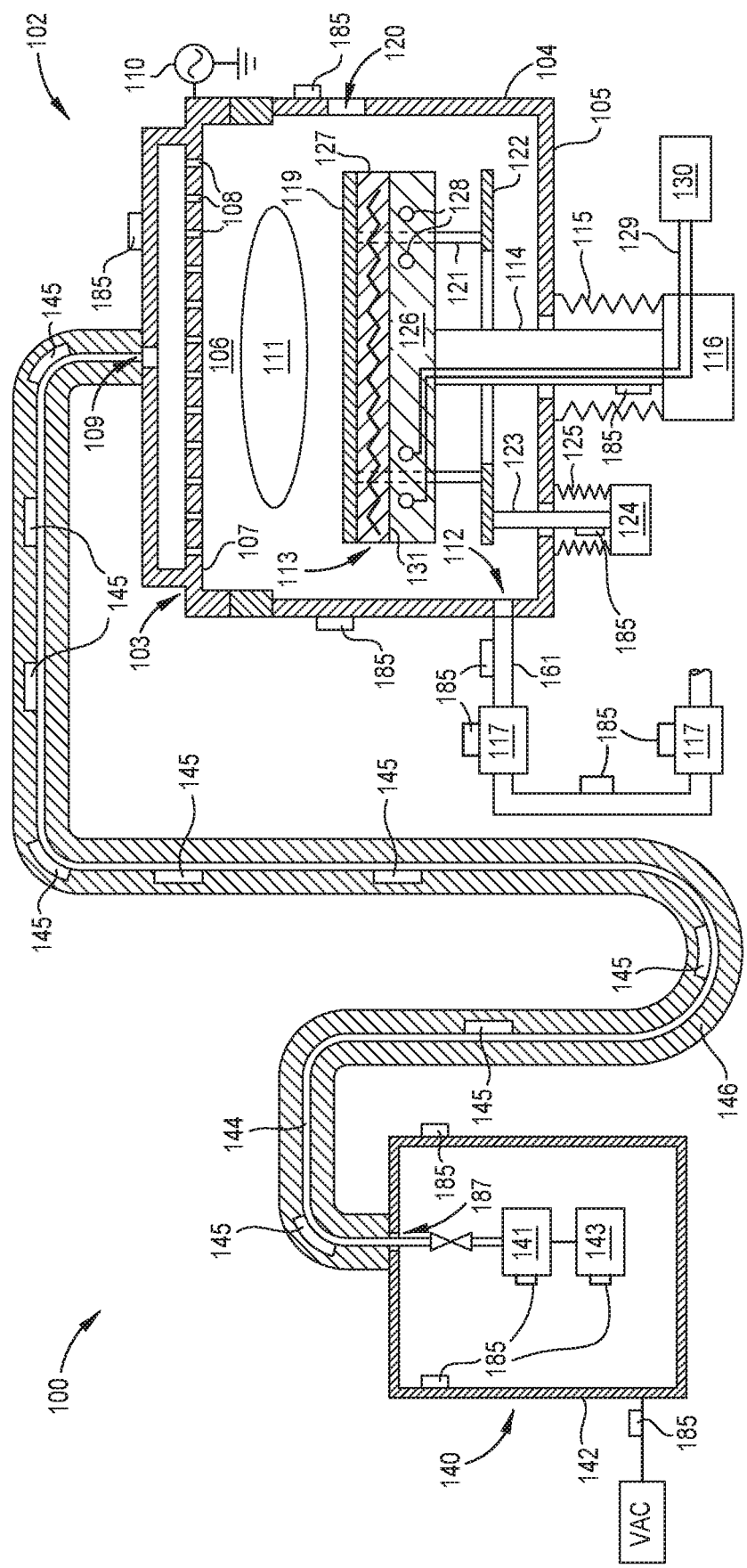
FIG. 1 is a schematic sectional view of a single chamber processing system according to one embodiment.

FIG. 1 is a schematic sectional view of a single chamber processing system, according to one embodiment. The processing system 100 includes a processing chamber 102 and a vapor-phase precursor delivery system 140. Here, the processing chamber 102 is chemical vapor deposition (CVD) chamber, specifically a plasma enhanced CVD chamber. In other embodiments, the processing chamber is any processing chamber configured to process a substrate using vapor-phase precursors by exposing a surface of a substrate thereto, or any processing chamber where remote monitoring of components external to a processing volume thereof is desired. For example, in some embodiments the systems and methods described herein are adapted for use with a thermal CVD chamber, an atomic layer deposition (ALD) chamber including a plasma enhanced ALD chamber, an etch chamber, such as a plasma enhanced etch chamber, a thermal processing chamber, an implant chamber, or combinations thereof.

As shown in FIG. 1, the processing chamber 102 features a lid assembly 103, one or more sidewalls 104, and a chamber bottom 105 which collectively define a processing volume 106. A gas distributer 107 commonly referred to as a showerhead, having a plurality of openings 108 disposed therethrough, is disposed in the lid assembly 103 and is used to uniformly distribute processing gases, including vapor-phase precursors, from a gas inlet 109 into the processing volume 106. The gas distributer 107 is coupled to a power supply 110, such as an RF or VHF power supply, which supplies the power to ignite and maintain a processing plasma, here the plasma 111, composed of the processing gases through capacitive energy coupling therewith. The processing volume 106 is fluidly coupled to a chamber exhaust 117 through a vacuum outlet 112, such as to one or more dedicated vacuum pumps, e.g., a turbo pump, a rough pump, or a combination thereof. The chamber exhaust 117 maintains the processing volume 106 at sub-atmospheric conditions and evacuates processing and other gases therefrom.

In some embodiments, an exhaust conduit 161 fluidly coupling the processing volume 106 to the chamber exhaust 117 is heated to prevent condensation of unreacted vapor-phase precursors or deposition of the precursor in the exhaust conduit 161 at a location proximate to the processing volume 106. A substrate support assembly 113, disposed in the processing volume 106 is disposed on a support shaft 114 sealingly extending through the chamber bottom 105. A first bellows 115 circumscribes the support shaft 114 and is coupled to the chamber bottom 105 and a first actuator 116 to provide a flexible seal therebetween and to maintain the vacuum integrity of the processing volume 106. The support shaft 114 is coupled to the first actuator 116 which is configured to raise and lower the support shaft 114, and thus the substrate support assembly 113 disposed thereon, to facilitate processing of a substrate 119 and transfer thereof to and from the processing chamber 102.

The substrate 119 is loaded into, and removed from, the processing volume 106 through an opening 120 in one of the one or more sidewalls 104, which is conventionally sealed with a door or a valve (not shown) during substrate processing. A plurality of lift pins 121 disposed above, but engageable with, a lift pin hoop 122 are movably disposed through the substrate support assembly 113 to facilitate transferring of the substrate 119 to and from a substrate receiving surface thereof. The lift pin hoop 122 is coupled to a lift hoop shaft 123 extending through the chamber bottom 105, which raises and lowers the lift pin hoop 122 using a second actuator 124 coupled to the lift hoop shaft 123. A second bellows 125 circumscribes the lift hoop shaft 123 and is coupled to the chamber bottom 105 and the second actuator 124 to provide a flexible seal therebetween and to maintain the vacuum integrity of the processing volume 106. When the lift pin hoop 122 is in a raised position, the plurality of lift pins 121 are contacted from below and moved to extend above a substrate receiving surface of the substrate support assembly 113 lifting the substrate 119 therefrom and enabling access to the substrate 119 by a robot handler (not shown). When the lift pin hoop 122 is in a lowered position the tops of the plurality of lift pins 121 are flush with, or below, the receiving surface of the substrate support assembly and the substrate 119 rests thereon.

Typically, the substrate support assembly 113 includes a support base 126 and a substrate support 127 thermally coupled to, and disposed on, the support base 126. In some embodiments, the support base 126 is used to regulate the temperature of the substrate support 127, and the substrate 119 disposed on the substrate receiving surface of the substrate support 127, during processing. The support base 126 herein includes one or more cooling channels 128 disposed therein that are fluidly coupled to, and in fluid communication with, a coolant source 130 through one or more coolant lines 129. Typically, the coolant source 130 is a refrigerant source or water source having a relatively high electrical resistance.

Herein, the support base 126 is formed of a corrosion resistant thermally conductive material, such as a corrosion resistant metal, for example aluminum, an aluminum alloy, or stainless steel, and is thermally coupled to the substrate support 127 with an adhesive or by mechanical means. The substrate support 127 is typically formed of a dielectric material, such as a metal oxide or a metal nitride, for example aluminum oxide, and, in some embodiments, includes one or more heaters 131, such as one or more resistive heating elements, embedded therein. In some embodiments, the substrate support assembly 113 includes both the one or more heaters 131 and cooling channels 128 to enable fine temperature control of the temperature of the substrate support 127 and the substrate 119 disposed thereon. Typically, the substrate 119 is secured to the substrate support 127 by means of an electrostatic chucking (ESC) force. The chucking force is a function of a potential between a voltage provided to a chucking electrode (not shown) embedded in the dielectric material of the substrate support 127 and the substrate 119 disposed thereon. In some embodiments, the substrate support assembly 113 further includes one or more bias electrodes (not shown) embedded in the dielectric material of the substrate support 127, where the one or more bias electrodes are coupled to one or more bias power supplies (not shown).

The precursor delivery system 140 includes one or more vapor-phase precursor sources 141 disposed in, or coupled to, a gas supply cabinet 142. The vapor-phase precursor source 141 vaporizes a liquid precursor, provided from a liquid-phase precursor ampoule 143 in fluid communication therewith, using a thermal and/or vacuum enhanced vaporization process. In other embodiments, the vapor-phase precursor source 141 is a liquid injection vaporizer configured to provide a mixture of the vapor-phase precursor and a carrier gas to the processing volume 106 of the processing chamber 102. In some embodiments, the vapor-phase precursor source 141 is configured to vaporize or sublimate a solid precursor.

During substrate processing operations, one or more vapor-phase precursors flow into the processing volume 106 through a delivery conduit 144 in fluid communication therewith. Typically, the delivery conduit 144 is disposed in a heater jacket 146, configured to supply heat energy to maintain the delivery conduit 144 at a desired temperature, along the length thereof. In some embodiments, the heater jacket 146 is formed of a flexible polymer material and includes one or more resistive heating elements (not shown) where the one or more resistive heating elements is disposed proximate to, disposed on, and/or in intimate contact with the delivery conduit 144. In other embodiments, the delivery conduit 144 is maintained at a desired temperature using a heater tape (not shown) wrapped around the conduit along the length, or along portions of the length, thereof.

The vapor-phase precursor source 141 may be located remote from the processing chamber 102, such as in a sub-fab (typically a building floor beneath the floor where the processing chamber 102 is located, i.e., below a cleanroom area where the processing chamber 102 is located) or may be located proximate to and/or adjacent to the processing chamber.

In embodiments herein, temperatures of one or more system components of the processing system 100 are monitored using a plurality of first sensors 145 and/or a plurality of second sensors 185. The first sensors 145 and the second sensors 185 comprise components of an advanced temperature monitoring system 220 described below. Examples of suitable sensors which may be used as the first sensors 145 and/or the second sensors 185 include thermocouples, such any one or combination of K, J, E, T, R, S, B, N, and/or W type thermocouples, resistance temperature detectors (RTD), voltage output temperature sensors, and combinations thereof.

Figure 2:
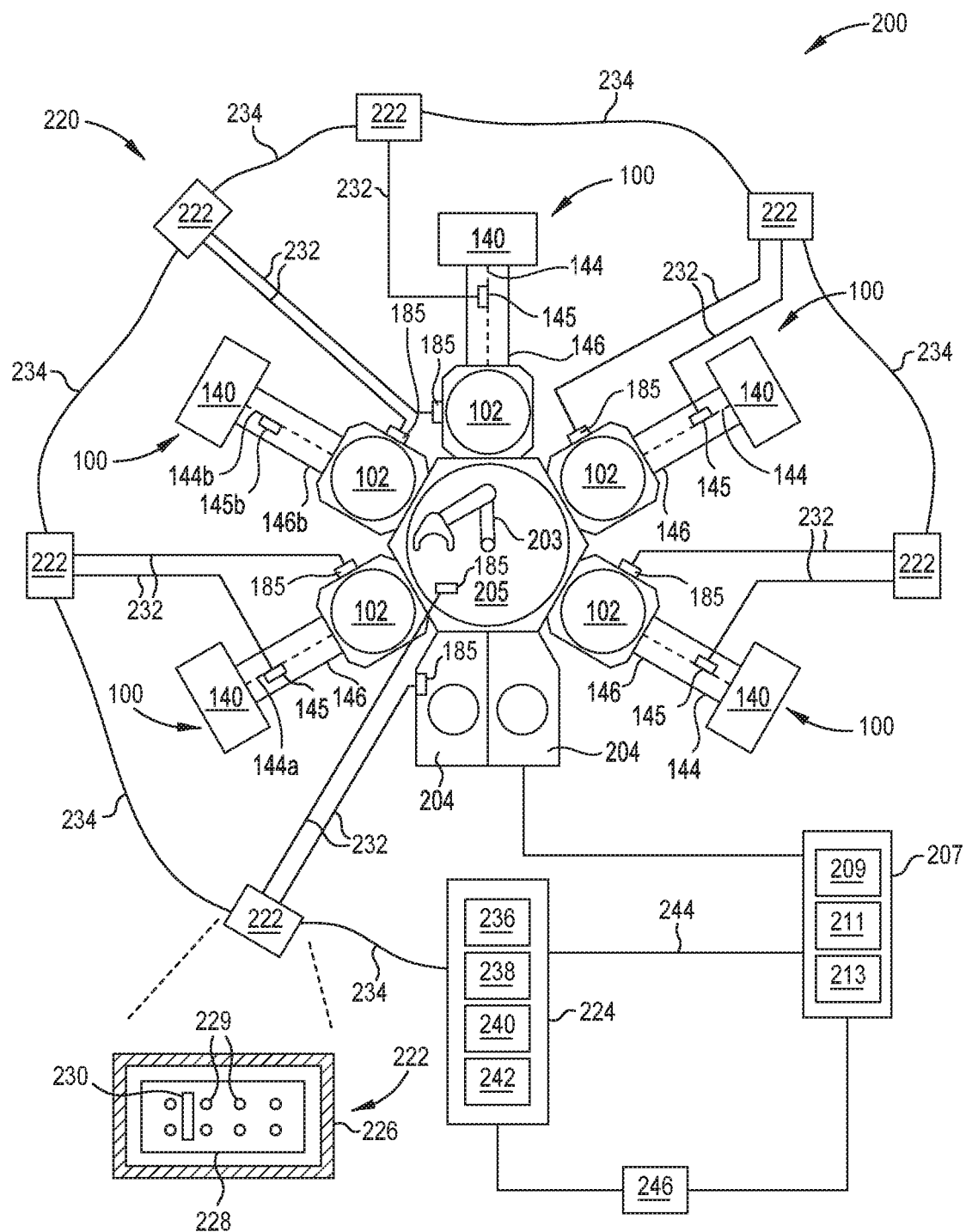
FIG. 2 is a schematic plan view of a multi-chamber processing system and a schematic representation of an advanced temperature monitoring system used therewith, according to one embodiment.

Here, the plurality of first sensors 145 are used to measure temperatures of the delivery conduit 144 and the plurality of second sensors 185 are used to measure temperatures of other components of the processing system 100 and/or the multi-chamber processing system 200 of FIG. 2. For example, in some embodiments individual ones of the plurality of first sensors 145 are disposed on, disposed proximate to, disposed adjacent to, and/or disposed in intimate contact with the delivery conduit 144 at a respective plurality of locations along the length thereof. Each of the plurality of first sensors 145 measures a temperature of a surface of the delivery conduit 144 and/or a temperature proximate to a surface of the delivery conduit 144 at respective locations along the length thereof.

In some embodiments, one or more of the plurality of first sensors 145 are positioned at locations where non-uniform temperature excursions may be considered more likely to occur, such as in a location where the delivery conduit passes through an opening formed in a sheet metal wall, such as an opening formed in the gas supply cabinet 142, or an opening formed in a floor between a sub-fab and a cleanroom, or at locations of bends in the delivery conduit 144, or at locations where the delivery conduit 144 and/or the heater jacket 146 are likely to be inadvertently contacted, such as in high foot traffic areas, or at locations where one or more segments of the heater jacket 146 are joined. In some embodiments, the plurality of first sensors 145 are spaced apart at regular intervals along the length, or along portions of the length, of the delivery conduit 144.

Generally, the one or more second sensors 185 are disposed on, located proximate to, located adjacent to, or in intimate contact with surfaces of components of the processing system 100. For example, in some embodiments, one or more second sensors 185 are disposed on an exhaust conduit 161 or foreline fluidly coupling the processing volume 106 to the chamber exhaust 117 or fluidly coupling one or more vacuum pumps of the chamber exhaust 117 to one another. In some embodiments, one or more second sensors 185 are disposed on, in, and/or proximate to the gas supply cabinet 142 and/or on the liquid-phase precursor ampoule 143 enabling monitoring of the gas supply cabinet environment and/or the precursor ampoule respectively. In some embodiments, one or more second sensors 185 are disposed on surfaces of the processing chamber 102 external to the processing volume 106, such as on and/or proximate to the door or valve (not shown) used to seal the opening 120 to the processing volume 106. In some embodiments, one or more second sensors 185 are disposed on the support shaft 114 of the substrate support assembly 113 in a location external to the processing volume 106 or on the lift hoop shaft 123 in a location external to the processing volume 106, and/or on the respective actuators 116, 124 coupled thereto.

The advanced temperature monitoring systems 220, 320, and 420 described below provide flexible and expandable configurations of connection modules 222, terminal blocks 228, and housings 226 which may be used with any desired configuration of temperature sensors, e.g., the first and second sensors 145, 185. Beneficially, the advanced temperature monitoring systems 220, 320, and 420 desirably provide flexible sensor 145, 185 and wiring management, e.g., electrical conductor 232, layout schemes, which are suitable for use, and thus productizable, in a semiconductor device manufacturing facility, i.e., a "fab."

Here, the one or more second sensors 185 may be positioned at one or more desired locations on and/or proximate to the processing system 100 for purposes of troubleshooting processing and/or equipment performance issues related thereto. Embodiments where the advanced monitoring system 220 includes one or more second sensors 185 disposed in locations external to a processing volume of a processing chamber are suitable for use with any substrate processing system where remote monitoring of processing system temperatures is desired, including use with CVD chambers, ALD chambers, etch chambers, physical vapor deposition (PVD) chambers, implant chambers, and/or thermal processing chambers.

FIG. 2 is a schematic top view of a multi-chamber processing system 200 and an advanced temperature monitoring system 220 which may be used therewith, according to one embodiment. Here, the multi-chamber processing system 200 includes a plurality of the processing systems 100 described in FIG. 1, a substrate handling system 202, and a system controller 207. The substrate handling system 202 includes one or more load lock chambers 204 and a transfer chamber 205 (shown with the top removed) having a robot handler 203 disposed therein. In some embodiments, one or more second sensors 185 are disposed on, located proximate to, located adjacent to, and/or in intimate contact with surfaces of the load lock chambers 204, the transfer chamber 205 and the robot handler 203 disposed therein, and/or components thereof or related thereto, such as a motor coupled to the robot handler 203. For example, in some embodiments one or more second sensors 185, are disposed on, in, proximate to, adjacent to, or intimate contact with doors or valves disposed between load lock chambers 204 and the transfer chamber 205 or doors or valves disposed between the transfer chamber 205 and processing chambers 102.

Here, the system controller 207 is used to control the operation of the load lock chambers 204, the transfer chamber 205 and the robot handler 203 disposed therein, and the individual operation of each of the plurality of processing systems 100. For example, for each of the processing systems 100, the system controller 207 may be used to control the process sequence, regulate the gas flows, including vapor-phase precursors, from the precursor source 141 into the processing volume 106, to heat and cool and/or maintain the substrate support 127 and the substrate 119, disposed on a substrate receiving surface thereof at a desire temperature, ignite and maintain the plasma 111 by controlling the power provided to the lid assembly 103 by the power supply 110, and control substrate handling operations including raising and lowering of the support shaft 114 and/or the lift hoop shaft 123 by the first and second actuators 116 and 124 respectively.

Here, the system controller 207 includes a central processing unit (CPU) 209, a memory 211, and support circuits 213. The CPU 209 is a general purpose computer processor configured for use in an industrial setting for controlling processing chamber and sub-processors related thereto. The memory 211 herein includes random access memory, read only memory, floppy or hard disk drive, or other suitable forms of digital storage, local or remote. The support circuits 213 are conventionally coupled to the CPU 209 and comprise cache, clock circuits, input/output subsystems, power supplies, and the like, and combinations thereof. In some embodiments, the system controller 207 further includes one or more computer readable media (not shown).

Computer readable media herein includes any device, located either locally or remotely from the system controller 207, which is capable of storing information that is retrievable by a computing device. Examples of computer readable media useable with embodiments of the present disclosure include solid state memory, floppy disks, internal or external hard drives, and optical memory (CDs, DVDs, BR-D, etc.). In one embodiment, the computer readable media comprises the memory 211. Further, any connection is properly termed a computer-readable medium. For example, when instructions are transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Software routines, when executed by the CPU 209, transform the CPU into a specific purpose computer, herein the system controller 207, which controls the operation of the multi-chamber processing system 200, such that the processes are performed in accordance with embodiments of the disclosure. In some embodiments, the software routines are stored and/or executed by a second controller (not shown) that is located remotely from multi-chamber processing system 200. In other embodiments, the processes described herein, or portions thereof, are performed by one or more application specific integrated circuits (ASIC) or other types of hardware implementations. In some other embodiments, the processes described herein are performed by a combination of software routines, ASIC(s), and/or other types of hardware implementations.

The advanced temperature monitoring system 220 includes the first sensors 145, the second sensors 185, a plurality of connection modules 222, and an advanced temperature monitoring system (ATMS) controller 224. As shown in FIG. 2, each of the plurality of connection modules 222 includes a housing 226, one or more terminal blocks 228 disposed within the housing 226, and an optional cold-junction compensation (CJC) temperature sensor 230. The CJC temperature sensor 230 may be used to provide a reference cold junction temperature for use in determining the hot junction temperature at a desired measuring point.

Generally, each of the terminal blocks 228 includes between about 10 and about 30 connection terminals 229, such as about 20 connection terminals 229, each configured to receive one or more electrical conductors 232, e.g., wires or cables, which connects a corresponding sensor 145, 185 to the terminal block 228. Here, each of the connection modules 222 is expandable to include between 1 and 30 terminal blocks 228. Thus, each of the connection modules 222 may be configured to provide between about 10 and 900 connection terminals 229, such as about 200 connection terminals 229. In the multi-chamber processing system 200 of FIG. 2 each of the connection modules 222 provides connection terminals 229 for pluralities of sensors 145, 185 corresponding to an individual processing system 100 and/or the substrate handling system 202. In other embodiments, each of the connection modules 222 may be configured to provide connection terminals 229 for sensors 145, 185 corresponding to more than one processing system 100 and/or to one or more processing systems 100 and the substrate handling system 202.

In FIG. 2, the plurality of connection modules 222 are arranged in series so that each individual one of the plurality of connection modules 222 is coupled to another individual one of the plurality of connection modules 222 using a connection cable 234 disposed therebetween. Here, at least one of the connection modules 222 in the series of connection modules 222 is coupled to the ATMS controller 224 using a connection cable 234.

The ATMS controller 224 includes a central processing unit (CPU) 236, a memory 238, and support circuits 240, and a multi-channel analog-to-digital (ND) convertor 242. The ATMS controller 224 is used to convert electrical signals received from the first and second sensors 145, 185 into temperature data, monitor the temperature data for undesirable temperature excursions in real time, generate historical data for storage, perform statistical analysis of the historical data, and/or flag temperature excursions, i.e., temperature changes beyond an acceptable range, to a user. The CPU 236, memory 238, and support circuits 240 may be the same or substantially similar to the CPU 209, a memory 211, and support circuits 213 described above with respect to the system controller 207. The A/D convertor 242 is used to convert analog voltage signals received from the sensors 145, 185, via the plurality of connection modules, into digitized information, i.e., temperature data. Software routines, when executed by the CPU 236, transform the CPU 236 into a specific purpose computer, herein the ATMS controller 224. Typically, the ATMS controller 224 is communicatively coupled to the system controller 207 through a wired communication link 244, e.g., an Ethernet cable. In some embodiments, the communication link 244 comprises a wireless communication protocol. In some embodiments, the ATMS controller 224 is communicatively coupled to a fab-level control system 246, such as described below. In other embodiments, the ATMS controller 224 is operated independently, e.g., without communication or communicative coupling with the system controller 207 and the fab-level control system 246.

The system controller 207 provides system processing information, such as substrate processing information and/or maintenance operation information, to the ATMS controller 224 through the communication link 244. System processing information herein relates to instructions executed by the system controller 207 to the control the operation of the multi-chamber processing system 200. In some embodiments, system processing information further includes conditions of the multi-chamber processing system 200, such as substrate processing conditions, communicated to the system controller 207 by processing condition sensors disposed in, on, proximate to, or adjacent to the processing system, for example pressure sensors, temperature sensors, and/or flow-rate sensors (including flowmeters).

Typically, system controllers configured for use with substrate processing systems in semiconductor device manufacturing, such as the system controller 207, have at least two modes for controlling the operation of the multi-chamber processing system 200. The first mode, a processing mode, controls substrate processing and processing system operations related thereto. The second mode, a maintenance mode, allows a user, typically a maintenance technician or engineer, to conduct maintenance procedures on the processing system, for example venting the processing volume of the processing chamber to atmosphere to enable the user to open the processing chamber and have access thereinto.

System processing information related to substrate processing when the multi-chamber processing system 200 is in a processing mode includes the beginning of a substrate processing sequence, the end of a substrate processing sequence, and/or substrate processing sequence activities therebetween. Examples of process sequence activates include the beginning and end of pumping down the processing volume 106 to a desired processing pressure, flowing processing gases into the processing volume 106, igniting the plasma 111, and/or chucking the substrate 119 to the substrate support 127. In some embodiments, the system processing information further includes processing chamber conditions before, during, and/or after substrate processing therein, for example, the pressure in the processing volume 106, the temperature of the substrate support 127, and, sometimes, the temperature of the substrate 119.

In some embodiments, the system processing information further includes a process recipe (instructions provided by the system controller 207 with respect to processing conditions for a particular substrate or type of substrate) corresponding to the process sequence. System processing information related to equipment maintenance typically includes the beginning of maintenance mode (instructions to the system controller 207 allowing access by a user to maintenance functions executed by the system controller 207), the end of maintenance mode, and/or maintenance activities therebetween performed using the system controller 207, for example venting the processing volume 106 to atmosphere to enable access thereinto or pumping down the processing volume 106 to a desired vacuum condition after closure thereof. In some embodiments, the system processing information further includes processing chamber conditions such as pressure and temperature during maintenance operations thereon. Herein, system processing information is received by the ATMS controller 224 contemporaneously with the processing event (e.g., the beginning of a substrate processing sequence) and in parallel with digitizing sensor information received from the sensors 145, 185.

In one embodiment, the ATMS controller 224 uses system processing information and temperature sensor information (received in parallel) to generate historical data for storage and retrieval, and/or contemporaneous statistical data analysis. Herein, historical data indicates a subset of the temperature data which is suitable for storage and retrieval and/or use with conventional statistical process control methods. For example, in one embodiment, historical data generated by the ATMS controller 224 includes individual temperatures, herein $T_n$, measured by each of the plurality of first sensors 145 at locations along the delivery conduit 144, corresponding system processing information, and the respective day(s) and time(s) corresponding thereto. In another embodiment, the historical data includes an average of the temperatures, herein $T_{avg}$, measured by the plurality of first sensors 145 at locations along the delivery conduit 144, corresponding system processing information, and the respective day(s) and time(s) corresponding thereto.

In another embodiment, the historical data includes a difference in the temperatures measured by the plurality of first sensors 145 disposed at locations along the delivery conduit 144, such as the difference between the maximum measured temperature and the minimum measured temperature, herein $\Delta T$, and/or the standard deviation of the measured temperatures, herein $T_{stdev}$, corresponding system processing information, and the day(s) and time(s) corresponding thereto. In other embodiments, the historical data includes individual temperatures measured by one or more of the second sensors 185, corresponding system processing information, and the respective day(s) and time(s) corresponding thereto.

In some embodiments, the ATMS controller 224 is configured to monitor historical data using statistical process control methods. For example, in some embodiments, the historical data is plotted on a graph with pre-determined control limits and/or otherwise compared to one or more pre-determined control limits and flagged if a data point (e.g., one or more temperature measurements, or one or more values calculated using a plurality of temperature measurements), for a specified processing event (e.g., the beginning of a substrate processing sequence) falls above and/or below the one or more pre-determined control limits. In some embodiments, the ATMS controller 224 is configured to alert a user to an out-of-control event (when one or more data points falls outside of the one or more pre-determined control limits). Typically, once alerted, the user will initiate a pre-determined action plan to troubleshoot the out-of-control event, also known as out-of-control action plan (OCAP), typically a flowchart that guides the users response to the out-of-control event.

Herein, alerting a user to an out-of-control event includes any form of alert designed to communicate the out-of-control event to a desired user, including visual and audio alarms and/or electronic messaging, e.g., automatically generated email and/or automatically generated text messages. In some embodiments, the ATMS controller 224 is configured to communicate the out-of-control event to the system controller 207 and the system controller 207 is configured to sound an alarm and/or suspend substrate processing operations. In some embodiments, the ATMS controller 224 is configured to communicate historical data and/or out-of-control events to a fab-level control system 246 communicatively coupled thereto. Typically, the system controller 207 is communicatively coupled to the fab-level control system 246. Thus, in some embodiments the ATMS controller 224 may be used to communicate historical data and/or out-of-control events to the fab-level control system 246 and the fab-level control system 246 may be used to communicate the system controller 207 and/or instruct the system controller 207 to sound an alarm and/or suspend substrate processing operations.

In some embodiments, the ATMS controller 224 is configured to contemporaneously monitor the temperature data received from the sensors 145, 185 and to trigger an alarm event if the temperature data falls outside of predetermined control limits. In some of those embodiments, the ATMS controller 224 is configured to generate and store historical data related to the alarm event. Examples of statistical process control models and a visual display, e.g., a dashboard, which may be used to monitor the processing system 200 and to communicate out-of-control events to a user are schematically represented in FIGS. 6A-6D and 7 respectively.

Figure 3:
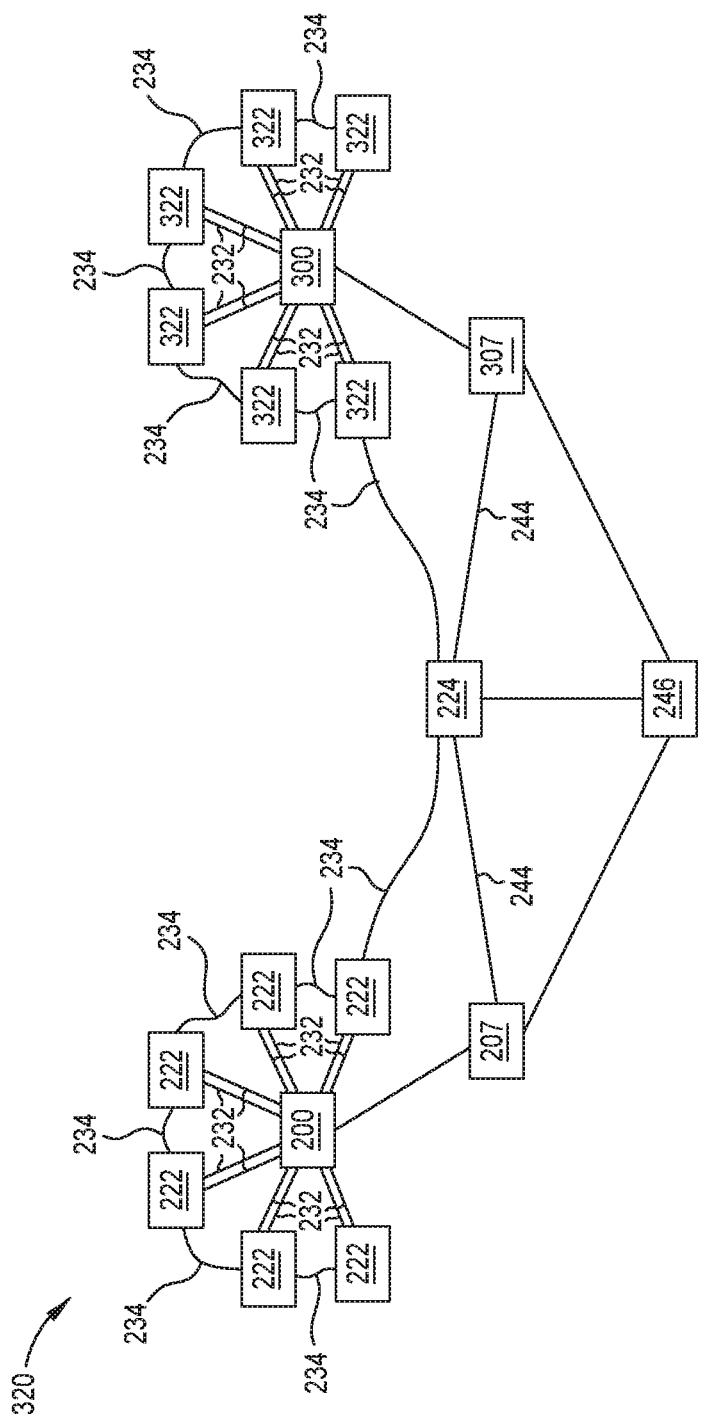
FIG. 3 is a schematic representation of an advanced temperature monitoring system configured for use with a plurality of multi-chamber processing systems, according to one embodiment.

FIG. 3 is a schematic representation of an advanced temperature monitoring system 320 configured for use with a plurality of multi-chamber processing systems 200, 300, according to one embodiment. Here, the advanced temperature monitoring system 320 includes a first plurality of connection modules 322 configured to receive electrical conductors 232 coupled to the first and second sensors 145, 185 (shown in FIG. 2) which are used to monitor the temperatures of surfaces of a (first) multi-chamber processing system 200. The advanced temperature monitoring system 320 further includes a second plurality of connection modules 222 configured to receive electrical conductors 232 coupled to first and second sensors 145, 185 (FIG. 2) used to monitor the temperatures of surfaces of a second multi-chamber processing system 300. Here, the second multi-chamber processing system 300 is the same or substantially similar to the first multi-chamber processing system 200. The first and second pluralities of the connection modules 222 for the respective first and second multi-chamber processing systems 200, 300 are each arranged in series and coupled to the ATMS controller 224 in the manner described above in FIG. 2.

Figure 4:
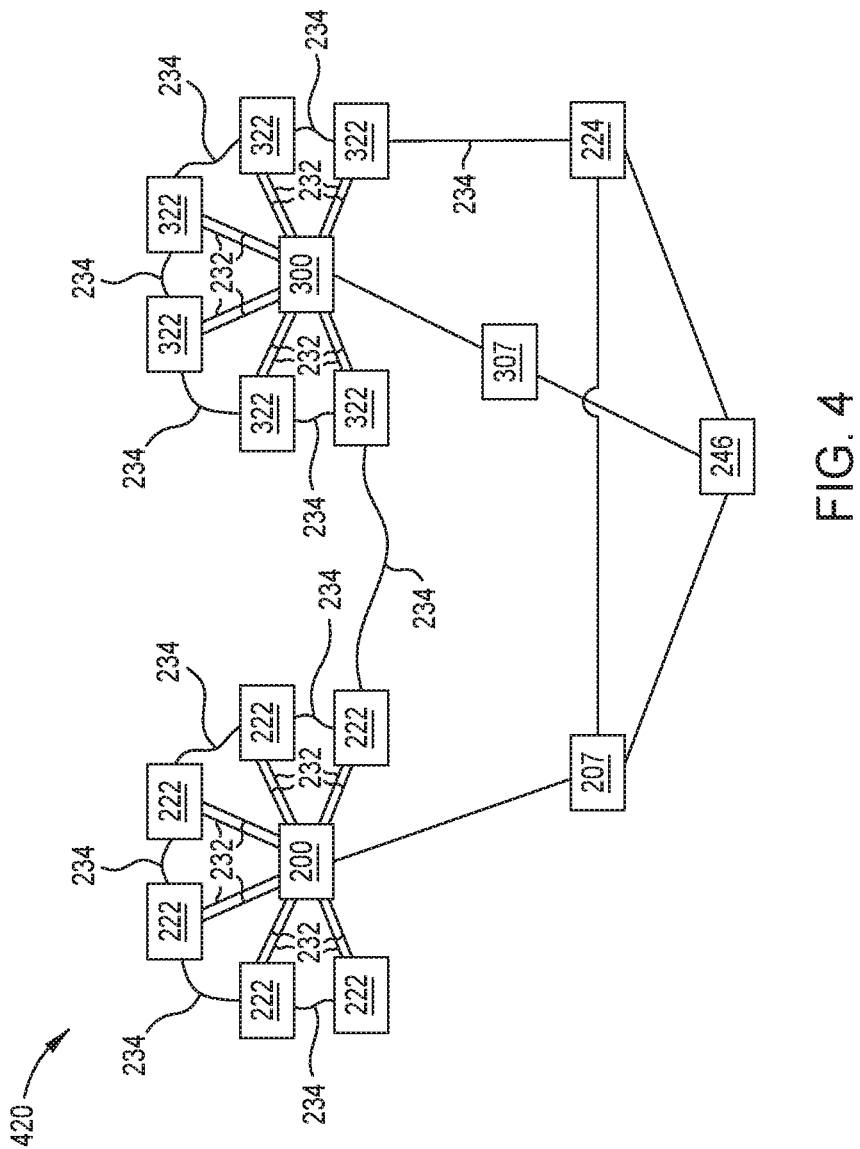
FIG. 4 is a schematic representation of an advanced temperature monitoring system configured for use with a plurality of multi-chamber processing systems, according to another embodiment.

FIG. 4 is a schematic representation of an advanced temperature monitoring system 420 configured for use with a plurality of multi-chamber processing systems 200, 300, according to another embodiment. Here, the advanced temperature monitoring system 420 includes a first plurality of the connection modules 222 corresponding to the first multi-chamber processing system 200 and a second plurality of the connection modules 322 corresponding to the second multi-chamber processing system 300. The first and second pluralities of the connection modules 222 are arranged in series with one another so that at least one of the connection modules 222 corresponding to the first multi-chamber processing system 200 is connected to at least one of the connection modules 222 corresponding to the second multi-chamber processing system 300.

Figure 5:
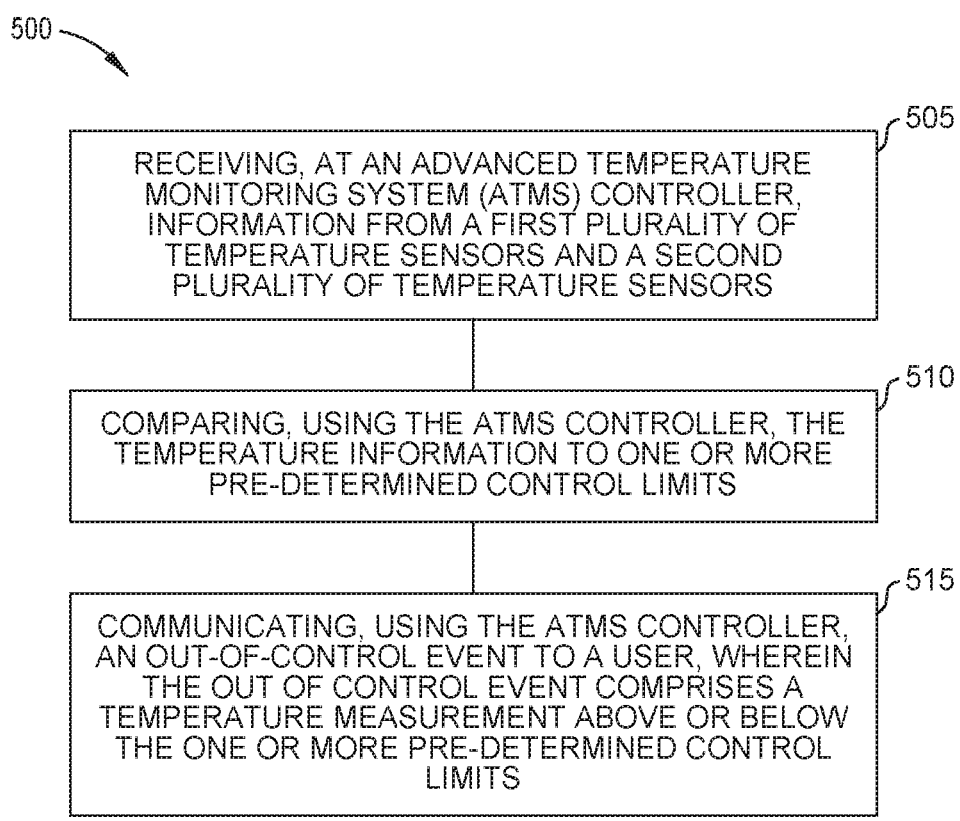
FIG. 5 is a diagram illustrating a method of monitoring a processing system, according to one embodiment.

FIG. 5 is a diagram illustrating a method 500 of monitoring a plurality of surfaces of a processing system for changes in temperature using the advanced temperature monitoring systems described herein. At activity 505 the method 500 includes receiving, using an advanced temperature monitoring system (ATMS) controller, information from a first plurality of temperature sensors and a second plurality of temperature sensors. Generally, individual ones of the first and second pluralities of temperature sensors are disposed in locations external to one or more processing volumes of one or more corresponding processing chambers.

In some embodiments, individual ones of the first or second pluralities of temperature sensors are disposed on, located proximate to, located adjacent to, or are in intimate contact with one or more surfaces of the processing system including surfaces of one or more load lock chambers, one or more transfer chambers, one or more robot handlers, one or more motors respectively coupled to the one or more robot handlers, one or more doors or valves disposed between the one or more transfer chambers and one or more processing chambers, one or more doors or valves disposed between the one or more transfer chambers and the one or more load lock chambers, one or more gas supply cabinets, one or more liquid-phase precursor ampoules, respective substrate support shafts of the one or more processing chambers, respective lift hoop shafts of the one or more processing chambers, one or more first actuators respectively coupled the substrate support shafts to the one or more processing chambers, one or more second actuators respectively coupled to the lift hoop shafts one the or more processing chambers, respective exhaust conduits fluidly coupled to the one or more processing chambers, respective dedicated chamber exhaust pumps, respective forelines, respective chamber walls of the one or more processing chambers, respective chamber lid assemblies of the one or more processing chambers, respective chamber bases of the one or more processing chambers, a plurality of locations along at least portions of lengths of one or more vapor-phase delivery conduits, or combinations thereof.

In some embodiments, the advanced temperature monitoring system comprises the first and second pluralities of temperature sensors, the ATMS controller, a first connection module, and a second connection module. The first connection module comprises a first housing having one or more first terminal blocks disposed therein and the second connection module comprises a second housing having one or more second terminal blocks disposed therein. In some embodiments, each of the first plurality of sensors are coupled to corresponding connection terminals of the one or more first terminal blocks and each of the second plurality of sensors are coupled to corresponding connection terminals of the one or more second terminal blocks. Here, the first and second connection modules are arranged in series so that the first connection module is coupled to the second connection module using a first cable and the second connection module is coupled to the ATMS controller using a second cable.

Figure 6A:
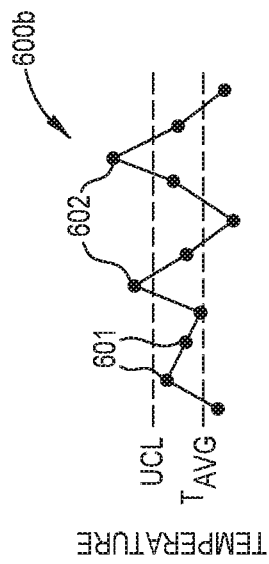
FIGS. 6A-6D are schematic representations of statistical process control graphs, according to one embodiment, which may be used with the methods described herein.
Figure 6B:
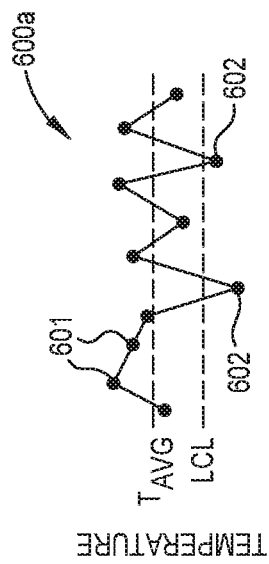
Figure 6C:
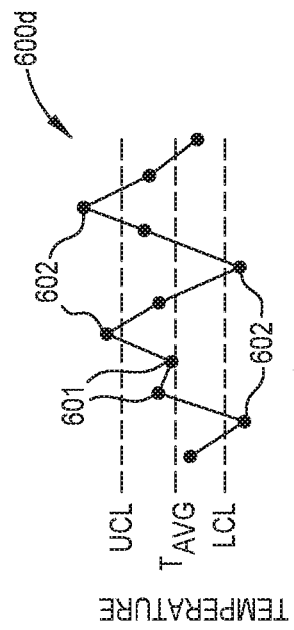
Figure 6D:
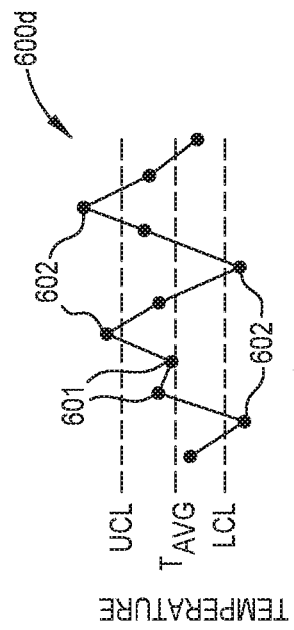

At activity 510 the method 500 includes comparing, using the ATMS controller, the temperature information to one or more pre-determined control limits. Examples of statistical process control (SPC) models 600a-d which may be used with the method 500 are respectively illustrated in FIGS. 6A-6D. In FIG. 6A the first SPC model 600a may be used by the ATMS controller to monitor temperatures (T) of one or more temperature sensors by comparing the temperature measurements 601 to a predetermined lower control limit (LCL). The temperature T, as measured by a corresponding sensor, is plotted on the SPC chart over time (t). The SPC model 600b of FIG. 6B may be used by the ATMS controller to compare temperature measurements 601 from corresponding temperature sensors to an upper control limit (UCL). The SPC models 600c,d of FIGS. 6C,6D may be used by the ATMS controller to compare temperature measurements 601 of corresponding sensors to both lower control limits (LCL) and upper control limits (UCL). When a temperature measurement 601 falls below a LCL or exceeds an UCL a corresponding out-of-control event 602 is stored in the memory of the ATMS controller before and/or concurrently with communicating the out-of-control event 602 to a user at activity 515.

At activity 515 the method 500 includes communicating, using the ATMS controller, an out-of-control event 602 to a user, wherein the out of control event comprises a temperature measurement above and/or below the one or more pre-determined control limits, e.g, the LCL and/or UCL illustrated in FIGS. 6A-6D. In some embodiments, the method 500 optionally includes displaying, using the ATMS controller, a visual representation of temperature information obtained using the advanced temperature monitoring system such as one or more of the dashboards of the visual display scheme 700 schematically represented in FIG. 7.

In some embodiments, the method 500 further includes receiving, using the ATMS controller, system processing information from a system controller coupled to the processing system.

In some embodiments, the method 500 further includes, generating historical processing data comprising temperature information, system processing information, and day and time information. In some embodiments, the method 500 further includes storing the historical processing data in a memory of the ATMS controller. In some embodiments the method 500 further includes comparing the historical processing data to one or more pre-determined control limits. In some embodiments, the method 500 further includes communicating an out-of-control event to a user, where the out-of-control event comprises one or more historical data points above or below one or more pre-determined control limits. In some embodiments of the method 500, the system processing information comprises substrate processing information, maintenance operation information, or a combination thereof.

The method 500 enables a user of an advanced temperature monitoring system to contemporaneously view temperature measurements of, or proximate to, a vapor-phase precursor delivery conduit, at a plurality of locations along the length, or a portion of the length, thereof. Further, in some embodiments, the ATMS controller 224 is configured, using sensor identification information, to display the approximate respective locations of each temperature measurement which is beneficial for troubleshooting and or standard maintenance procedure purposes. For example, in troubleshooting a temperature excursion a user can determine and approximate location of the excursion using corresponding sensor identification information displayed by the ATMS controller. In another example, a maintenance procedure may require a user, using the advanced monitoring system, to ensure that the temperature of the vapor-phase delivery conduit is at a uniform desired temperature along the length thereof before the user returns the system controller to a substrate processing mode. By ensuring the temperature of the vapor-phase delivery conduit is at a uniform desired temperature before flowing a vapor-phase thereinto, undesirable condensation in the vapor-phase delivery conduit can be avoided along with particle contamination issues associated therewith.

The method 500 further enables process development and improvement, and improved statistical process control, based on statistical analysis of historical information for one or more processing events. For example, statistical analysis of historical information may reveal that some temperature excursions correlate to a specific process sequence or sequence activity and a change in the sequence or sequence activity might substantially reduce, and/or eliminate the temperature excursion and, therefore, reduce or eliminate particle contamination issues associated therewith.

Figure 7:
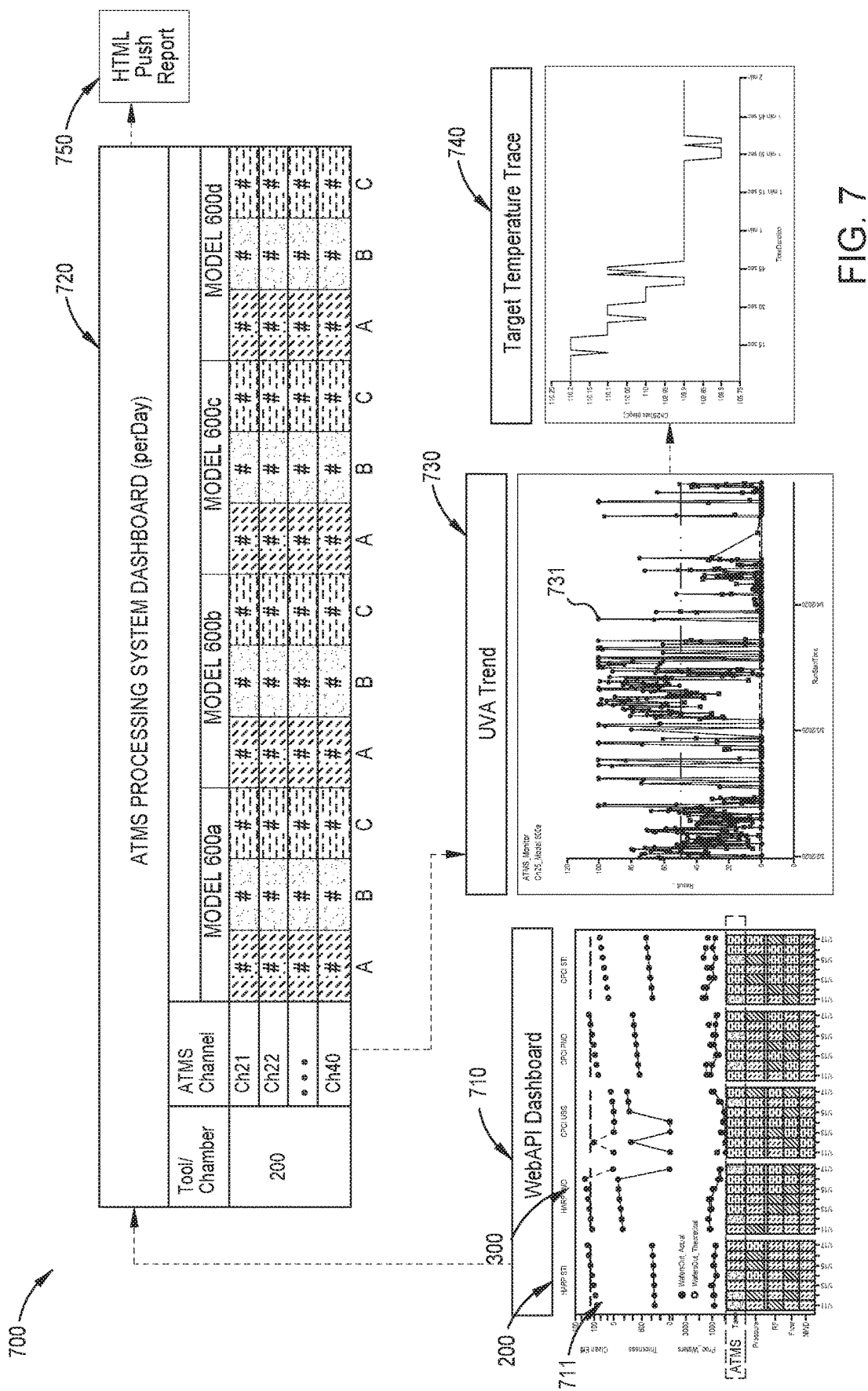
FIG. 7 is a schematic representation of a visual display, according to one embodiment, which may be used with the methods described herein.

Here, the visual display scheme 700 is configured for use with one or more multi-chamber processing systems, such as one or both of the Producer™ or Centura™ multi-chamber processing platforms available from Applied Materials Inc., of Santa Clara, CA. As shown in FIG. 7, the visual display scheme 700 includes a fab level dashboard 710, a processing system dashboard 720, a univariate analysis (UVA) trend chart 730, and a temperature trace chart 740. Information for each of the dashboards and/or charts may be compiled by the ATMS controller 224 as a report 750 for any desired time period. Here, the fab level dashboard 710 provides a visual display of any desirable information communicated to the ATMS controller 224 from the fab-level control system 246, one or more system controllers 207, 307 of corresponding processing systems 200, 300, or both. For example, here the fab level dashboard 710 includes a visual representation, e.g., graphs 711 of one or more substrate measurements taken before, after, and/or concurrent with substrate processing in a substrate processing system. Examples of substrate measurements include film thickness measurements and/or surface defectivity measurements taken using a suitable metrology system. Metrology systems used to provide the substrate measurements may be integrated with a substrate processing system 200, 300 and/or may be a stand-alone metrology system. Such substrate measurements may be communicated to the temperature monitoring system ATMS controller 224 via a system controller 207, 307 and/or the fab-level control system 246. In some embodiments, the substrate measurements shown in the fab level dashboard 710 are an average of a plurality of substrate measurements taken over a given time period, e.g., and average of substrate measurements taken over a day. Here, the fab level dashboard 710 further includes a visual representation of processing excursions for different processing parameters such as temperatures provided by the advanced temperature monitoring system described herein and other processing parameters, such as pressure, flowrates, and power required to ignite and maintain a processing plasma.

Here, each of the processing systems represented in the fab-level dashboard 710 has a corresponding processing system dashboard 720 which is configured to provide a visual display of temperature excursions for each of the temperature sensors 145, 185 used therewith. In the processing system dashboard 720 each of the temperature sensors 145, 185 is represented as a ATMS channel (e.g., Ch21, Ch22, . . . ) and are shown as arranged in rows. Corresponding columns A, B, C represent processing system health as determined by each of the SPC models 600a-d described above for FIGS. 6A-6D and/or further statistical analysis thereof. For example, in some embodiments each of the columns A, B, C, are configured to visually represent the processing system health based on a univariate analysis of temperature information corresponding to each of the temperature sensors, such as shown in the UVA trend chart 730. Here, the processing system dashboard 720 shows processing system health over a time period of the proceeding 24 hours although any desirable time period may be selected.

The UVA trend chart 730 is a visual representation of a univariate analysis of temperature measurements from an individual temperature sensor taken over a desired time period. Here, each point 731 in the UVA trend chart 730 represents univariate analysis of temperature measurements taken during a material deposition process for an individual substrate in an individual processing chamber. The vertical y-axis represents the percentage of temperature measurements during the deposition process that fell outside of a control limit (above or below) as set forth for one of the SPC models 600a-d described above. The number of points 731 above an upper threshold, e.g., >50% are represented by a value # in column C, the number of points 731 between the upper threshold of about 50% and a lower threshold, e.g., about 3% are represented as a value # in column B and the number of points 731 below the lower threshold 3% are represented as a value in column A where a higher number # in column A as compare to columns B and C is desired. Typically, each point 731 in the UVA trend chart 730 has a corresponding temperature trace chart 740 which a user may select to see the temperature profile from an individual sensor 145, 185 during the deposition process for an individual substrate.

Figure 8:
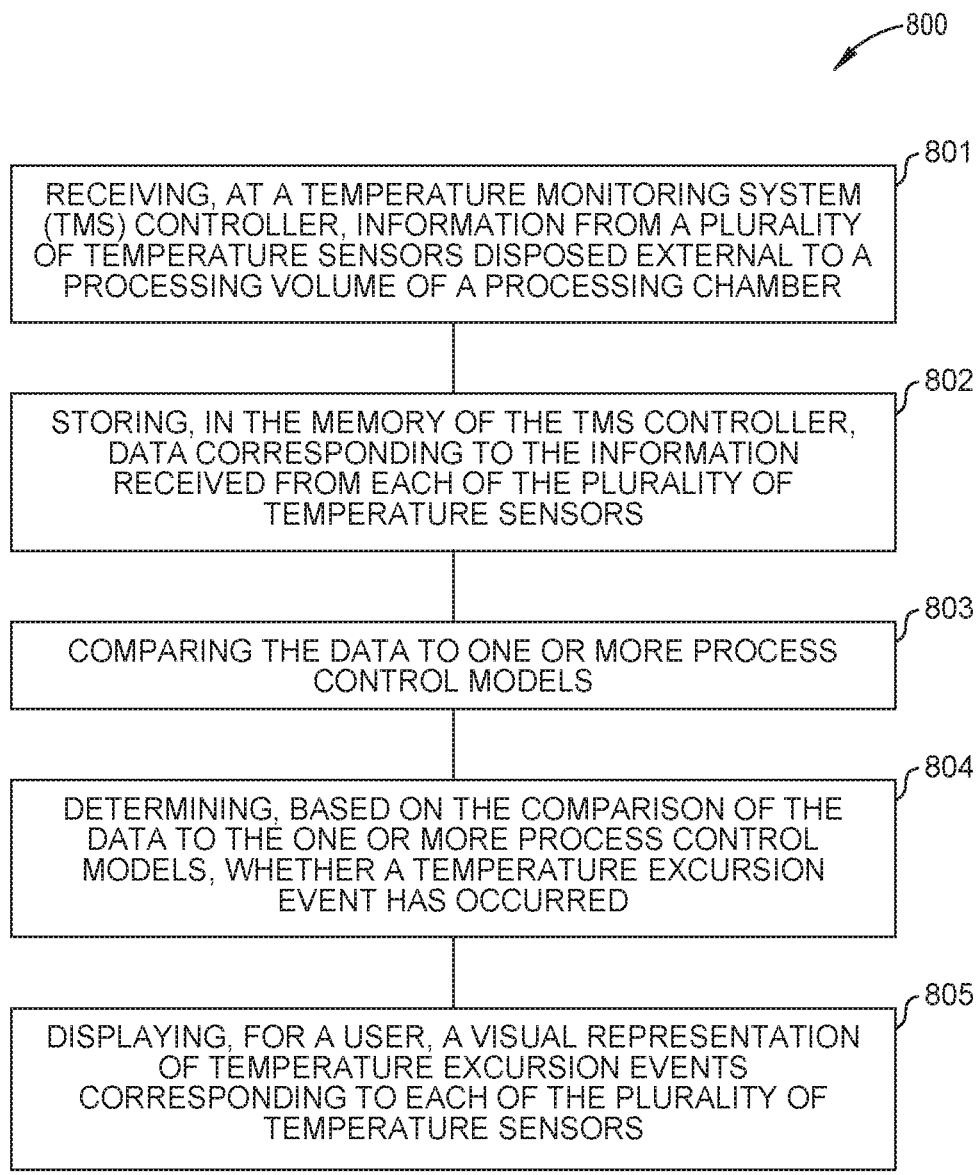
FIG. 8 is a diagram illustrating a method of controlling a processing system using the advanced temperature monitoring systems described herein.

FIG. 8 is a diagram of a method 800 of detecting processing temperature excursions in a processing system, according to one embodiment. It is contemplated that any aspect of the method 800 may be incorporated into the method 500 described above to facilitate monitoring and/or control of a multi-chamber processing system using the advanced temperature monitoring systems described herein.

At activity 801, the method 800 includes receiving, at a temperature monitoring system (TMS) controller, such as the ATMS controller 224, information from a plurality of temperature sensors disposed external to a processing volume of a processing chamber. At activity 802, the method 800 includes storing, in the memory of the TMS controller, data corresponding to the information received from each of the plurality of temperature sensors. At activity 803, the method 800 includes comparing the data to one or more statistical process control models, such as one of the statistical process control models 600a-d described above. At activity 804, the method 800 includes determining, based on the comparison of the data to the one or more process control models, whether a temperature excursion event has occurred. At activity 805, the method 800 includes displaying, for a user, a visual representation of temperature excursion events corresponding to each of the plurality of temperature sensors. In some embodiments, displaying the visual representation of excursion event is done using the visual display scheme 700 of FIG. 7.

While the foregoing is directed to embodiments of the present disclosure, other and further embodiments of the disclosure may be devised without departing from the basic scope thereof, and the scope thereof is determined by the claims that follow.

The invention claimed is:

1. A method of monitoring one or more processing systems, comprising:
   monitoring, using a temperature monitoring system (TMS), a plurality of surfaces of the one or more processing systems for changes in temperature, comprising:
      receiving, at a first input of a first connection module, first information from a first temperature sensor of a first plurality of temperature sensors disposed external to a processing volume of a processing chamber;
      receiving, at a TMS controller, the first information from an output of the first connection module;
      receiving, at a first input of a second connection module, second information from a second temperature sensor of a second plurality of temperature sensors disposed external to the processing volume of the processing chamber;
      receiving, at a second input of the first connection module, the second information from an output of the second connection module;
      receiving, at the TMS controller, the second information from the output of the first connection module, wherein
         the TMS comprises the first and second temperature sensors, the TMS controller, the first connection module, and the second connection module,
         the first connection module comprises a first housing having one or more first terminal blocks disposed therein,
         the second connection module comprises a second housing having one or more second terminal blocks disposed therein,
         individual ones of the first and second pluralities of temperature sensors are disposed in locations external to one or more processing volumes of one or more corresponding processing chambers within the one or more processing systems;
         the first temperature sensor is coupled to a corresponding connection terminal of the one or more first terminal blocks,
         the second temperature sensor is coupled to a corresponding connection terminal of the one or more second terminal blocks, and
         the first and second connection modules are arranged in series so that the first connection module is coupled to the second connection module using a first cable and the first connection module is coupled to the TMS controller using a second cable;
      comparing, using the TMS controller, the first information and second information to one or more pre-determined control limits; and
      communicating, using the TMS controller, an out-of-control event to a user, wherein the out-of-control event comprises a temperature measurement above or below the one or more pre-determined control limits.

2. The method of claim 1, wherein individual ones of the first and second pluralities of temperature sensors are at least one of disposed on, located proximate to, located adjacent to, and/or are disposed in intimate contact with one or more surfaces of the processing system including surfaces of one or more load lock chambers, one or more transfer chambers, one or more robot handlers, one or more motors respectively coupled to the one or more robot handlers, one or more doors or valves disposed between the one or more transfer chambers and one or more processing chambers, one or more doors or valves disposed between the one or more transfer chambers and the one or more load lock chambers, one or more gas supply cabinets, one or more liquid-phase precursor ampoules, respective substrate support shafts of the one or more processing chambers, respective lift hoop shafts of the one or more processing chambers, one or more first actuators respectively coupled the substrate support shafts to the one or more processing chambers, one or more second actuators respectively coupled to the lift hoop shafts one the or more processing chambers, respective exhaust conduits fluidly coupled to the one or more processing chambers, respective dedicated chamber exhaust pumps, respective forelines, respective chamber walls of the one or more processing chambers, respective chamber lid assemblies of the one or more processing chambers, respective chamber bases of the one or more processing chambers, a plurality of locations along at least portions of lengths of one or more vapor-phase delivery conduits, or combinations thereof.

3. The method of claim 1, further comprising receiving, at the TMS controller, system processing information from a system controller coupled to the processing system, wherein the system processing information relates to instructions executed by the system controller to control one or more operations of the processing system.

4. The method of claim 3, further comprising:
   communicating, using the TMS controller, the out-of-control event to the system controller.

5. The method of claim 3, further comprising:
   generating data comprising temperature information, system processing information, and day and time information corresponding to the temperature information and the system processing information;
   storing the generated data in a memory of the TMS controller;
   comparing the generated data to one or more pre-determined control limits; and
   communicating an out-of-control event to a user, wherein the out-of-control event comprises one or more of the generated data points comprising a temperature measurement or a value calculated from one or more temperature measurements which is above or below the one or more pre-determined control limits.

6. The method of claim 1, wherein the one or more processing systems further comprise:
   a first vapor-phase precursor source and a first vapor-phase precursor delivery conduit fluidly coupling the first vapor-phase precursor source to a first processing volume of a first processing chamber; and
   a second vapor-phase precursor source and a second vapor-phase precursor delivery conduit fluidly coupling the second vapor-phase precursor source to a second processing volume of a second processing chamber, wherein
   individual ones of the first and second pluralities of temperature sensors are at least one of disposed on, disposed adjacent to, disposed proximate to, or in intimate contact with the first vapor-phase precursor delivery conduit, and
   the first processing chamber and the second processing chamber are connected by a transfer chamber to form a multi-chamber processing system.

7. The method of claim 1, wherein the one or more processing systems further comprise:
- a first vapor-phase precursor source and a first vapor-phase precursor delivery conduit fluidly coupling the first vapor-phase precursor source to a first processing volume of a first processing chamber; and
- a second vapor-phase precursor source and a second vapor-phase precursor delivery conduit fluidly coupling the second vapor-phase precursor source to a second processing volume of a second processing chamber, wherein
- individual ones of the first and second pluralities of temperature sensors are at least one of disposed on, disposed adjacent to, disposed proximate to, or in intimate contact with the first vapor-phase precursor delivery conduit, and
- the first processing chamber is one of a plurality of chambers of a first multi-chamber processing system and the second processing chamber is one of a plurality of chambers of a second multi-chamber processing system which is separate and distinct from the first multi-chamber processing system.

8. A method of detecting processing temperature excursions in a processing system, comprising:
- receiving, at a first input of a first connection module, first information from a first temperature sensor of a plurality of temperature sensors disposed external to a processing volume of a processing chamber;
- receiving, at a temperature monitoring system (TMS) controller, the first information from an output of the first connection module;
- receiving, at a first input of a second connection module, second information from a second temperature sensor of the plurality of temperature sensors disposed external to the processing volume of the processing chamber;
- receiving, at a second input of the first connection module, the second information from an output of the second connection module;
- receiving, at the TMS controller, the second information from the output of the first connection module;
- storing, in a memory of the TMS controller, data corresponding to the first information and second information received from each of the plurality of temperature sensors;
- comparing the data to one or more process control models;
- determining, based on the comparison of the data to the one or more process control models, whether a temperature excursion event has occurred; and
- displaying, for a user, a visual representation of temperature excursion events corresponding to each of the plurality of temperature sensors.

9. The method of claim 8, wherein the processing system comprises a vapor-phase precursor source and a vapor-phase precursor delivery conduit fluidly coupling the vapor-phase precursor source to the processing volume of the processing chamber.

10. The method of claim 9, wherein one or more of the plurality of temperature sensors are disposed on, disposed adjacent to, disposed proximate to, or are disposed in intimate contact with the vapor-phase precursor delivery conduit.

11. The method of claim 10, wherein the processing system further comprises a processing system controller used to control one or more operations of the processing system, and wherein the method further comprises receiving, at the TMS controller, system processing information from the processing system controller.

12. The method of claim 11, further comprising:
- communicating, using the TMS controller, a temperature excursion event to the system controller.

13. The method of claim 10, further comprising:
- generating data comprising temperature information, system processing information, and day and time information corresponding to the temperature information and the system processing information;
- storing the generated data in a memory of the TMS controller;
- comparing the generated data to one or more pre-determined control limits; and
- communicating an out-of-control event to a user, wherein the out-of-control event comprises one or more of the generated data points comprising a temperature measurement or a value calculated from one or more temperature measurements which is above or below the one or more pre-determined control limits.

14. The method of claim 8, wherein individual ones of the plurality of temperature sensors are at least one of disposed on, located proximate to, located adjacent to, or in intimate contact with one or more surfaces of the processing system including surfaces of one or more load lock chambers, one or more transfer chambers, one or more robot handlers, one or more motors respectively coupled to the one or more robot handlers, one or more doors or valves disposed between the one or more transfer chambers and one or more processing chambers, one or more doors or valves disposed between the one or more transfer chambers and the one or more load lock chambers, one or more gas supply cabinets, one or more liquid-phase precursor ampoules, respective substrate support shafts of the one or more processing chambers, respective lift hoop shafts of the one or more processing chambers, one or more first actuators respectively coupled the substrate support shafts to the one or more processing chambers, one or more second actuators respectively coupled to the lift hoop shafts one the or more processing chambers, respective exhaust conduits fluidly coupled to the one or more processing chambers, respective dedicated chamber exhaust pumps, respective forelines, respective chamber walls of the one or more processing chambers, respective chamber lid assemblies of the one or more processing chambers, respective chamber bases of the one or more processing chambers, a plurality of locations along at least portions of lengths of one or more vapor-phase delivery conduits, or combinations thereof.

15. The method of claim 8, further comprising:
- receiving, at a first input of a third connection module, third information from a third temperature sensor of the plurality of temperature sensors disposed external to the processing volume of the processing chamber;
- receiving, at a second input of the second connection module, the third information from an output of the third connection module;
- receiving, at the second input of the first connection module, the third information from the output of the second connection module; and
- receiving, at the TMS controller, the third information from the output of the first connection module.

16. The method of claim 8, further comprising:
- receiving, at a second input of a first connection module, third information from a third temperature sensor of a plurality of temperature sensors disposed external to a processing volume of a processing chamber;

receiving, at the TMS controller, the third information from the output of the first connection module;

receiving, at a second input of a second connection module, fourth information from a fourth temperature sensor of the plurality of temperature sensors disposed external to the processing volume of the processing chamber;

receiving, at the second input of the first connection module, the fourth information from the output of the second connection module; and receiving, at the TMS controller, the fourth information from the output of the first connection module.

17. A temperature monitoring system, comprising:
a first plurality of temperature sensors disposed external to a processing volume of a processing chamber;
a second plurality of temperature sensors disposed external to a processing volume of a processing chamber;
a temperature monitoring system (TMS) controller;
a first connection module comprising a first housing and one or more first terminal blocks disposed therein, a first temperature sensor of the first plurality of temperature sensors coupled to the one or more first terminal blocks; and
a second connection module comprising a second housing having one or more second terminal blocks disposed therein, a second temperature sensor of the second plurality of temperature sensors coupled to the one or more second terminal blocks, wherein
  each of the first plurality of temperature sensors are coupled to corresponding connection terminals of the one or more first terminal blocks,
  each of the second plurality of temperature sensors are coupled to corresponding connection terminals of the one or more second terminal blocks, and
  the first and second connection modules are arranged in series so that the first connection module is coupled to the second connection module using a first cable and the first connection module is coupled to the TMS controller using a second cable.

18. The temperature monitoring system of claim 17, wherein individual ones of the first and second pluralities of temperature sensors are disposed in locations external to one or more processing volumes of one or more corresponding processing chambers.

19. The temperature monitoring system of claim 18, further comprising a computer readable medium having instructions stored thereon for performing a method when executed by a processor, the method comprising:
receiving, at the TMS controller, information from the first plurality of temperature sensors and the second plurality of temperature sensors;
comparing, using the TMS controller, the first information and second information to one or more pre-determined control limits; and
communicating, using the TMS controller, an out-of-control event to a user, wherein the out-of-control event comprises a temperature measurement above or below the one or more pre-determined control limits.

20. The temperature monitoring system of claim 19, wherein the method further comprises receiving, at the TMS controller, system processing information from a system controller coupled to the processing system, wherein the system processing information relates to instructions executed by the system controller to control one or more operations of the processing system.

21. The temperature monitoring system of claim 19, wherein the method further comprises:
generating data comprising temperature information, system processing information, and day and time information corresponding to the temperature information and the system processing information; and
storing the generated data in a memory of the TMS controller.

22. The temperature monitoring system of claim 17, further comprising a computer readable medium having instructions stored thereon for performing a method when executed by a processor, the method comprising:
receiving, at a first input of the first connection module, first information from the first temperature sensor of the first plurality of temperature sensors disposed external to a processing volume of a processing chamber;
receiving, at the TMS controller, the first information from an output of the first connection module;
receiving, at a first input of the second connection module, second information from the second temperature sensor of the second plurality of temperature sensors disposed external to the processing volume of the processing chamber;
receiving, at a second input of the first connection module, the second information from an output of the second connection module;
receiving, at the TMS controller, the second information from the output of the first connection module;
storing, in a memory of the TMS controller, data corresponding to the first information and second information received from each of the plurality of temperature sensors;
comparing the data to one or more process control models;
determining, based on the comparison of the data to the one or more process control models, whether a temperature excursion event has occurred; and
displaying, for a user, a visual representation of temperature excursion events corresponding to each of the plurality of temperature sensors.

* * * * *